United States Patent
Gupta et al.

(10) Patent No.: US 9,858,582 B2
(45) Date of Patent: Jan. 2, 2018

(54) INVENTORY CONTRIBUTION RULES FOR INVENTORY MANAGEMENT

(75) Inventors: Abhay Gupta, Los Altos, CA (US); Tsung-Jen Chou, Menlo Park, CA (US); Senthil Subramanian, Sunnyvale, CA (US); Pranav O. Sharma, Cupertino, CA (US); Isay Shnayder, San Francisco, CA (US)

(73) Assignee: Excalibur IP, LLC, New York, NY (US)

( * ) Notice: Subject to any disclaimer, the term of this patent is extended or adjusted under 35 U.S.C. 154(b) by 151 days.

(21) Appl. No.: 13/561,848

(22) Filed: Jul. 30, 2012

(65) Prior Publication Data

US 2014/0032305 A1    Jan. 30, 2014

(51) Int. Cl.
*G06Q 30/00* (2012.01)
*G06Q 30/02* (2012.01)

(52) U.S. Cl.
CPC ............. *G06Q 30/02* (2013.01); *G06Q 30/00* (2013.01)

(58) Field of Classification Search
CPC .... G06Q 30/02; G06Q 30/08; G06Q 30/0273; G06Q 30/0251; G06Q 30/0246; G06Q 30/0254; G06Q 30/0277; G06Q 30/0241; G06Q 30/0242; G06Q 30/0247; G06Q 30/0201; G06Q 30/0202; G06Q 30/0275; G06Q 30/0283; G06Q 30/0204; G06Q 30/0243; G06Q 30/0264; G06Q 10/04; G06Q 30/0276; G06Q 30/0244; G06Q 30/0255; G06Q 10/087; G06Q 30/0245; G06Q 30/00; G06Q 30/02

USPC .......... 705/14.51, 26.3, 14.49, 14.69, 14.41, 705/14.52, 14.73, 14.23, 14.45, 14.46, 705/14.72, 14.42, 14.71, 344, 7.31, 7.33, 705/14.44, 14.43
See application file for complete search history.

(56) References Cited

U.S. PATENT DOCUMENTS

| | | | |
|---|---|---|---|
| 7,886,226 B1* | 2/2011 | McCoy | G06F 17/212 715/273 |
| 2005/0203901 A1* | 9/2005 | Waldvogel | G06F 17/30545 |
| 2006/0206624 A1* | 9/2006 | Wang | G06F 17/3087 709/245 |
| 2008/0033776 A1* | 2/2008 | Marchese | 705/8 |
| 2008/0109285 A1* | 5/2008 | Reuther | G06F 17/30864 705/7.11 |
| 2009/0070177 A1* | 3/2009 | Agarwal | G06Q 30/02 705/7.12 |
| 2009/0300552 A1* | 12/2009 | Bollman | G06F 3/048 715/854 |

(Continued)

*Primary Examiner* — Matthew T Sittner
*Assistant Examiner* — Gautam Ubale
(74) *Attorney, Agent, or Firm* — Brinks Gilson & Lione

(57) ABSTRACT

Systems and methods for managing inventory in an online advertising system are described herein. The inventory may comprise advertisement ("ad") impressions. In accordance with certain implementations, the systems and methods enable advertisers to target groups of inventory (e.g., "run of" inventory groups) made available by publishers and sold at a non-premium rate, while also enabling the publishers to selectively designate certain inventory within a given inventory group as premium. Inventory so designated is automatically excluded from an inventory group to which it would normally belong both during a booking process as well as during an ad serving process.

20 Claims, 10 Drawing Sheets

(56) References Cited

U.S. PATENT DOCUMENTS

| | | | |
|---|---|---|---|
| 2010/0042496 A1* | 2/2010 | Wang | G06Q 10/087 705/14.49 |
| 2010/0082402 A1* | 4/2010 | Kantak et al. | 705/10 |
| 2010/0153218 A1* | 6/2010 | Wilson | G06Q 30/02 705/14.72 |
| 2010/0185484 A1* | 7/2010 | Sordo | G06Q 10/087 705/14.6 |
| 2010/0185516 A1* | 7/2010 | Swanson | G06Q 10/087 705/14.58 |
| 2010/0318413 A1* | 12/2010 | Zinkevich et al. | 705/14.4 |
| 2010/0318418 A1* | 12/2010 | Wertheimer et al. | 705/14.45 |
| 2011/0078027 A1* | 3/2011 | Li et al. | 705/14.69 |
| 2011/0106811 A1* | 5/2011 | Novoselsky | G06F 17/30911 707/741 |
| 2011/0231248 A1* | 9/2011 | Vee | G06Q 30/00 705/14.45 |
| 2011/0246312 A1* | 10/2011 | Meek et al. | 705/14.73 |
| 2011/0251875 A1* | 10/2011 | Cosman | 705/7.31 |
| 2011/0258045 A1* | 10/2011 | Chickering | G06Q 10/00 705/14.53 |
| 2011/0295723 A1* | 12/2011 | Priyadarshan et al. | 705/28 |
| 2012/0150635 A1* | 6/2012 | Raithatha et al. | 705/14.49 |
| 2012/0158526 A1* | 6/2012 | Cosman | 705/14.73 |
| 2012/0203625 A1* | 8/2012 | Soloff | G06Q 30/02 705/14.44 |
| 2013/0006777 A1* | 1/2013 | Krishnareddy et al. | 705/14.66 |
| 2013/0110622 A1* | 5/2013 | Shao et al. | 705/14.52 |
| 2014/0006170 A1* | 1/2014 | Collette et al. | 705/14.71 |

* cited by examiner

INVENTORY CONTRIBUTION RULES FOR INVENTORY MANAGEMENT

BACKGROUND OF THE INVENTION

Field of the Invention

The present invention generally relates to systems and methods for managing inventory. In particular, the present invention relates to systems and methods for managing the booking and utilization of online advertising opportunities.

Background

The Internet has emerged as a powerful advertising tool. It is commonplace to see advertisements ("ads") on many Web sites. For example, ads may be displayed on search Web sites and may be targeted to individuals based upon search terms submitted by the individuals. Other Web sites, such as news and sports Web sites, may provide space for display ads. Publishers of these Web sites may sell advertising space to advertisers to offset the costs associated with operating the Web sites as well as to turn a profit.

To place an ad, an advertiser may enter into a contract with a publisher to obtain a number of ad impressions on the publisher's Web site. An ad impression comprises a single instance of an online advertisement being displayed. For example, the advertiser may purchase 10,000 ad impressions for $100. The advertiser may further specify where, when, and/or to whom such ad impressions should be served. For example, the advertiser may specify a Web site or section of a Web site on which the ad impressions should be served, a time period during which the ad impressions should be served, or a target audience to whom the ad impressions should be served.

Ad impressions thus constitute a form of inventory. Online advertising systems exist that allow publishers to make their inventory available to advertisers. Such systems present the publisher inventory to advertisers in a manner that enables the advertisers to locate and book desired ad impressions for use in their ad campaigns.

Certain online advertising systems enable an advertiser to target ads to inventory located anywhere within a particular ad network (sometimes referred to as "run of network" inventory), to inventory located anywhere within the Web sites associated with a particular publisher (sometimes referred to as "run of publisher" inventory), to inventory located anywhere on a particular Web site (sometimes referred to as "run of site" inventory), or to inventory located anywhere within a particular section or channel of a Web site (sometimes referred to as "run of section" or "run of channel" inventory). By enabling inventory to be targeted in this manner, such systems enable publishers to offer less expensive rates to advertisers who are not concerned with targeting their ads to particular publishers, Web sites or sections. However, within such "run-of" inventory groups there may exist premium ad impressions that a publisher wishes to charge a higher price for and which are normally sold separately from the rest of the inventory. For example, it may be that ad impressions on the home page of a Web site (e.g., www.yahoo.com) are considered premium inventory and thus should always command a higher price relative to other ad impressions within the same Web site or within a network that includes the Web site. Additionally, it may be that ad impressions within a particular section of a Web site (e.g., Yahoo! Sports) are considered premium but only for a particular period of time (e.g., Super Bowl Sunday).

In view of the foregoing, it may be deemed desirable to provide an online advertising system that enables advertisers to target "run-of" inventory, but that also enables publishers to selectively designate certain inventory within a "run-of" inventory group as premium. Inventory so designated should not be included within the "run-of" inventory group to which it would normally belong both during the booking process as well as during ad serving. Such an online advertising system may enable publishers to manage their inventory to obtain the best yield while providing the best return on investment (ROI) to advertisers.

BRIEF SUMMARY OF THE INVENTION

Systems and methods for managing inventory in an online advertising system are described herein. The inventory may comprise advertisement ("ad") impressions. In accordance with certain implementations, the systems and methods enable advertisers to target groups of inventory (e.g., "run of" inventory groups) made available by publishers and sold at a non-premium rate, while also enabling the publishers to selectively designate certain inventory within a given inventory group as premium. Inventory so designated is automatically excluded from an inventory group to which it would normally belong both during a booking process as well as during an ad serving process.

In accordance with particular embodiments, the system and method enables publishers or agents thereof to create inventory contribution rules and associate such rules with different inventory groups. An inventory contribution rule may indicate that a particular inventory group should not contribute to a larger inventor group of which it forms a part. During both a booking process and an ad serving process, representations of ad impressions are selectively modified (also referred to as "decorated") to facilitate matching thereof to booking queries (in the case of the booking process) or committed bookings (in the case of the ad serving process) that target inventory groups to which the ad impressions belong. Such selective modification automatically accounts for any inventory contribution rules associated with the ad impressions. As will also be described herein, representations of the booking queries and bookings may also be modified (or "decorated") in order to facilitate the matching process.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
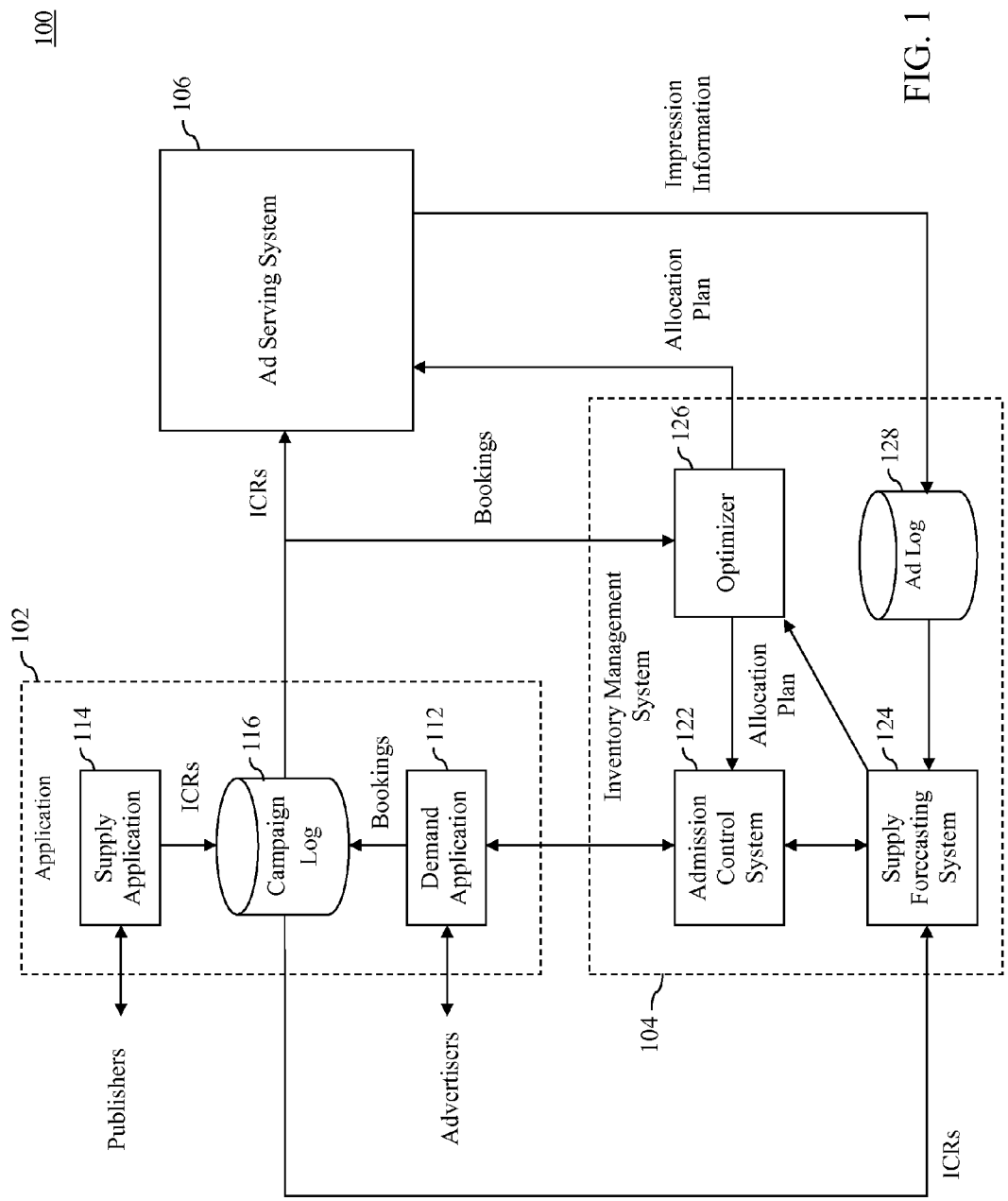
FIG. 1 is a block diagram of an example display advertising system in which an embodiment may operate.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

B. Example Display Advertising System

FIG. 1 is a block diagram of an example display advertising system 100 in which embodiments of the present invention may operate. As shown in FIG. 1, display advertisement system 100 includes an application 102, an inventory management system 104 and an advertisement ("ad") serving system 106. Each of these components will now be described.

Application 102 is a computer-implemented component that enables both advertisers and publishers to interact with display advertising system 100. As shown in FIG. 1, application 102 comprises both a demand application 112 and a supply application 114. Demand application 112 provides an interface by which advertisers or agents thereof can interact with inventory management system 104 to purchase or reserve in advance advertising opportunities that will arise when users of the Internet visit Web pages. Such advertising opportunities are referred to herein as ad impressions. An ad impression may be thought of as a single instance of an online advertisement being displayed. The purchasing or reserving in advance of such ad impressions is referred to herein as "booking." Bookings created via advertiser interaction with demand application 112 are stored in a campaign log 116 which may be considered part of application 102.

In accordance with particular embodiments, demand application 112 enables advertisers or agents thereof to target their ads to ad impressions located anywhere within a particular ad network (sometimes referred to as "run of network" inventory), to ad impressions located anywhere within a plurality of Web sites associated with a particular publisher (sometimes referred to as "run of publisher" inventory), to ad impressions located anywhere within a particular Web site (sometimes referred to as "run of site" inventory), or to ad impressions located anywhere within a particular section or channel of a Web site (sometimes referred to as "run of section" or "run of channel" inventory). By enabling ad impressions to be targeted in this manner, display advertising system 100 enables publishers to offer less expensive rates to advertisers who are willing to accept "run-of" bookings. Such advertisers may include, for example, advertisers who are not concerned with targeting their ads to particular publishers, Web sites or sections.

Supply application 114 provides an interface by which publishers or agents thereof can create inventory contribution rules (denoted "ICRs" in FIG. 1) in association with selected groups of ad impressions. For example and without limitation, a publisher or agent thereof may interact with supply application 114 to create an inventory contribution rule that is associated with ad impressions located on a particular publisher network, on a particular Web site, or on a particular section of a Web site. By implementing an inventory contribution rule, a publisher can indicate that a particular group of ad impressions should not contribute to a larger group of ad impressions of which the particular group forms a part. For example, by implementing an inventory contribution rule, a publisher can indicate that ad impressions located within a particular section of a Web site should not contribute to the group of ad impressions located across the entire Web site. As another example, by implementing an inventory contribution rule, a publisher can indicate that ad impressions located within a particular Web site should not contribute to the group of ad impressions located across an entire publisher network that includes the Web site. Still other examples of inventory contribution rules will be provided herein. In one embodiment, inventory contribution rules created by a publisher or agent thereof are stored in campaign log 116.

By implementing an inventory contribution rule with respect to a group of ad impressions, a publisher can designate such group as premium and thereby charge a higher price for it, even though such group may constitute part of a larger group of ad impressions that is offered at a non-premium rate (for example, a "run-of" inventory group). As will be discussed herein, display advertising system 100 is configured to automatically exclude groups of ad impressions having inventory contribution rules associated therewith from larger groups to which they would normally belong both during a booking process as well as during an ad serving process.

Inventory management system 104 is an automated system that is designed to interact with demand application 112 to enable advertisers to book desired ad impressions. In particular, an advertiser or agent thereof may interact with inventory management system 104 via demand application 112 to set up an advertising campaign, wherein part of setting up the advertising campaign includes booking certain ad impressions. Based on such booking activity, inventory management system 104 updates an allocation plan that indicates which ad impressions have been booked by which advertising campaigns and intermittently provides the updated allocation plan to ad serving system 106.

Ad serving system 106 utilizes the most recently-received version of the allocation plan to determine which display advertisements to serve when a Web page is delivered to a user that includes a particular advertising opportunity. In other words, ad serving system 106 determines which campaigns consume which advertising opportunities based on information provided in the allocation plan. When a display advertisement is served, an ad impression is said to have occurred, and information about the ad impression is stored in an ad log 128 that comprises part of inventory management system 104. Such impression information may include an identification of the advertising campaign to which the ad impression was allocated. Information stored in ad log 128 is then used by inventory management system 104 to update the allocation plan to account for the consumption of certain ad impressions by certain advertising campaigns.

Inventory management system 104 will now be further described. As shown in FIG. 1, in addition to ad log 128 which was discussed above, inventory management system 104 further includes an admission control system 122, a supply forecasting system 124, and an optimizer 126. Each of these components will now be described.

Admission control system 122 is configured to receive booking queries from demand application 112, wherein such booking queries specify ad impressions in which an advertiser is interested. Admission control system 122 interacts with supply forecasting system 124 to obtain an estimate of how many ad impressions will be available in the future that match or otherwise qualify for a booking query. Booking queries are intended to determine the availability of as-yet-unconsumed ad impressions at some point in the future. To process such a query, inventory management system 104 must be able to forecast the supply of ad impressions that will arise during a specified future time window. This function is performed by supply forecasting system 124.

In particular, supply forecasting system 124 utilizes historical information obtained from ad log 128 to model the future availability of various types of ad impressions. Optimizer 126 operates to obtain a forecasted supply of ad impressions from supply forecasting system 124 and allocates such forecasted supply among various existing advertising campaigns, information about which is stored in campaign log 116. In particular, optimizer 126 uses information about future supply obtained from supply forecasting system 124 and information about bookings obtained from campaign log 116 to update the allocation plan. As noted above, the allocation plan is delivered to ad serving system 106 and is used thereby to drive the allocation of certain types of ad impressions to certain advertising campaigns.

As shown in FIG. 1, the allocation plan is also intermittently delivered to admission control system 122. Admission control system 122 uses the most recently-received allocation plan to make decisions about booking new advertising campaigns. For example, admission control system 122 may use the allocation plan along with forecasted supply information from supply forecasting system 124 to determine whether a certain number of ad impressions are available to be booked by a new advertising campaign. If admission control system 122 books a new advertising campaign, then admission control system 122 will send information concerning the booking to campaign log 116 so that such information may be subsequently considered by optimizer 126 when generating an updated version of the allocation plan.

As noted above, demand application 112 is configured to enable advertisers to target groups of inventory (e.g., "run of" inventory groups) made available by publishers and sold at a non-premium rate, while supply application 114 is configured to enable publishers to selectively designate certain inventory within a given inventory group as premium through the creation of inventory contribution rules. Inventory so designated is automatically excluded from an inventory group to which it would normally belong both during a booking process as well as during an ad serving process.

To achieve this, representations of ad impressions used during the booking process and representations of ad impressions used during the ad serving process are selectively modified (also referred to as "decorated") to facilitate matching thereof to booking queries (in the case of the booking process) or committed bookings (in the case of the ad serving process) that target inventory groups to which the ad impressions belong. Such selective modification automatically accounts for any inventory contribution rules associated with the ad impressions. As will also be described herein, representations of the booking queries and bookings are also be modified (or "decorated") in order to facilitate the matching process. Various ways in which such decorating and matching may be performed will be described in the following section. The following section will also describe the manner in which inventory contribution rules are created, stored and distributed for use in the matching process.

C. Example Inventory Management Techniques Using Inventory Contribution Rules

In accordance with certain embodiments, each ad impression forecasted by supply forecasting system 144 and each ad impression that is served by ad serving system 106 may be represented using a predefined set of attributes and associated values. For example, the predefined set of attributes may include but are not limited to: a Network Identifier (ID) that uniquely identifies an ad network within which the add impression is located, a Publisher ID that uniquely identifies a group of publisher Web sites within which the ad impression is located, a Site ID that identifies a particular Web site within which the ad impression is located, and a Custom Section that identifies a section of a particular Web site within which an ad impression is located. These attributes are provided by way of example and are not intended to be limiting. Additional and/or alternative attributes may be used to represent an ad impression.

Figure 2:
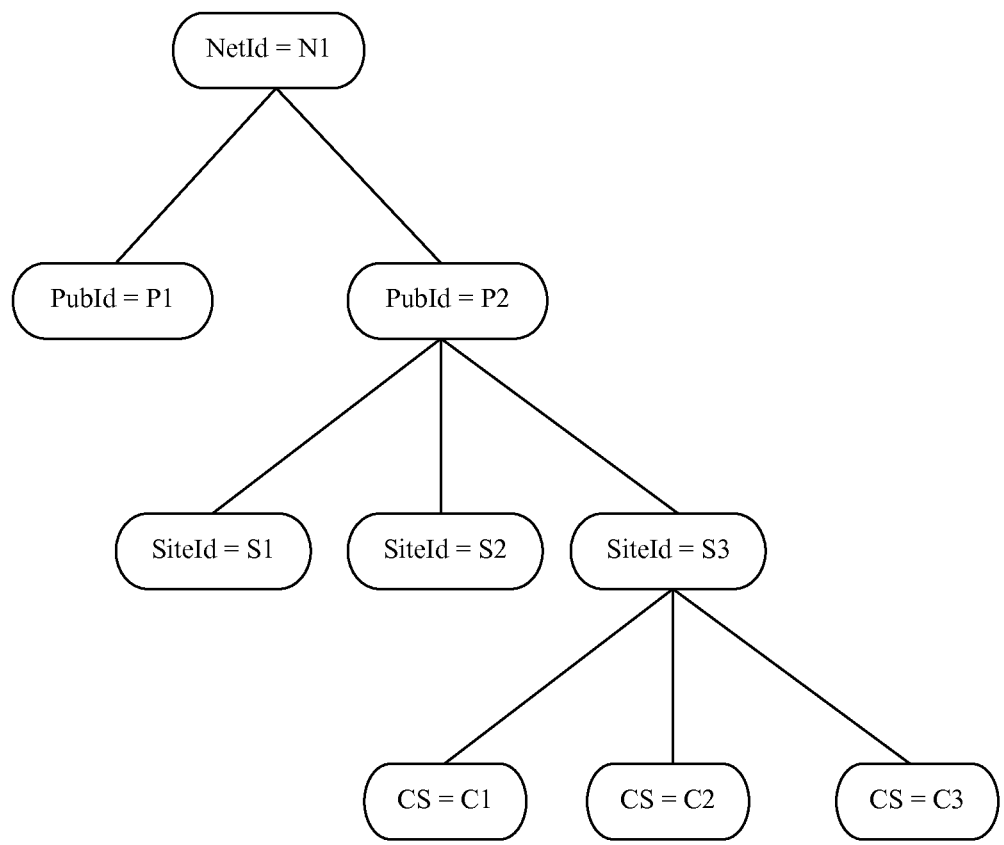
FIG. 2 is a diagram that illustrates a hierarchical relationship between attributes used to represent advertisement ("ad") impressions in a display advertising system in accordance with an embodiment.

FIG. 2 is a diagram 200 that illustrates that the example attributes described above may be interrelated in a hierarchical manner. In particular, as illustrated by diagram 200, a network having a Network ID ("NetId")=N1 may be associated with one or more publishers. In the particular example shown in FIG. 2, the network having Network ID=N1 is associated with a first publisher having a Publisher ID ("PubId")=P1 and a second publisher having a Publisher ID=P2. However, it is to be understood that a network may be associated with any number of publishers. Each publisher may, in turn, be associated with one or more Web sites. In the example shown in diagram 200, the publisher having Publisher ID=P2 is associated with a first Web site having a Site ID ("SiteId")=S1, a second Web site having a Site ID=S2, and a third Web site having a Site ID=S3. However, it is to be understood that a publisher may be associated with any number of Web sites. Each Web site, in turn may include one or more sections. In the example shown in diagram 200, the Web site having Site ID=S3 includes a first section having a Custom Section ("CS")=C1, a second section having a Custom Section ("CS")=C2, and a third section having a Custom Section ("CS")=C3. However, it is to be understood that a Web site may include any number of sections.

In one embodiment, display advertising system 100 is configured such that, in the absence of any applicable inventory contribution rules, inventory associated with any child in the hierarchy shown in diagram 200 will contribute to, or be included among, the inventory associated with the parent of that child. Thus, for example, any ad impressions available on the Web site sections having Custom Sections equal to CS1, CS2 or CS3 will be counted among the ad impressions available on the Web site having a Site ID equal to S3. As another example, any ad impressions available on the Web sites having Site IDs equal to S1, S2 or S3 will be counted among the ad impressions available on the Web sites associated with the publisher having a Publisher ID equal to P2. As yet another example, any ad impressions available on the Web sites associated with the publishers having Publisher IDs equal to P1 and P2 will be counted among the ad impressions available on the ad network having a Network ID equal to N1.

Figure 3:
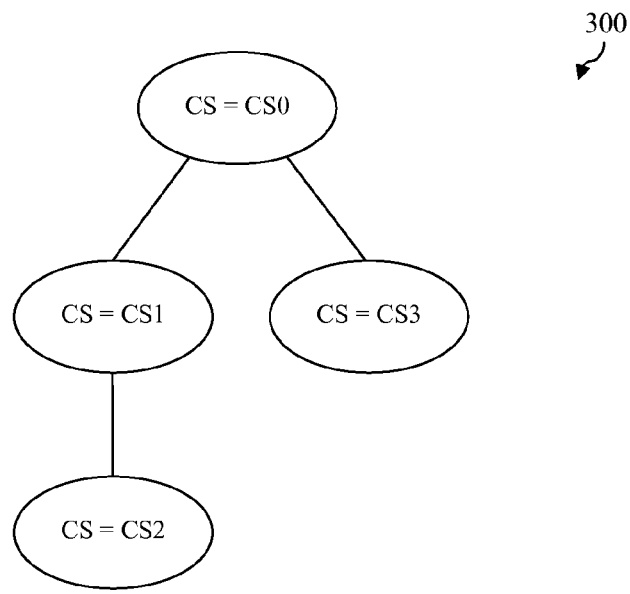
FIG. 3 is a diagram that illustrates a hierarchical relationship between the values of a Custom Section attribute used to represent ad impressions in a display advertising system in accordance with an embodiment.

FIG. 3 is a diagram 300 that illustrates that certain attributes may have values assigned thereto that are also interrelated in a hierarchical manner. In particular, in the example of FIG. 3, it is shown that the Custom Section ("CS") attribute can have a hierarchy of values associated therewith, wherein the hierarchy of values may include but is not limited to the values CS0, CS1, CS2 and CS3. In the hierarchy illustrated in FIG. 3, the value CS0 is the parent of values CS1 and CS3 and the value CS1 is the parent of the value CS2. In further accordance with such an embodiment, display advertising system 100 is configured such that, in the absence of any applicable inventory contribution rules, inventory associated with any child in the hierarchy shown in diagram 300 will contribute to, or be included among, the inventory associated with the parent of that child. Thus, for example, any ad impressions available on the Web site section having a Custom Section equal to CS2 will be counted among the ad impressions available on the Web site section having a Custom Section equal to CS1. As another example, any ad impressions available on the Web site sections having a Custom Section equal to CS1 or CS3 will be counted among the ad impressions available on the Web site section having a Custom Section equal to CS0.

Figure 4:
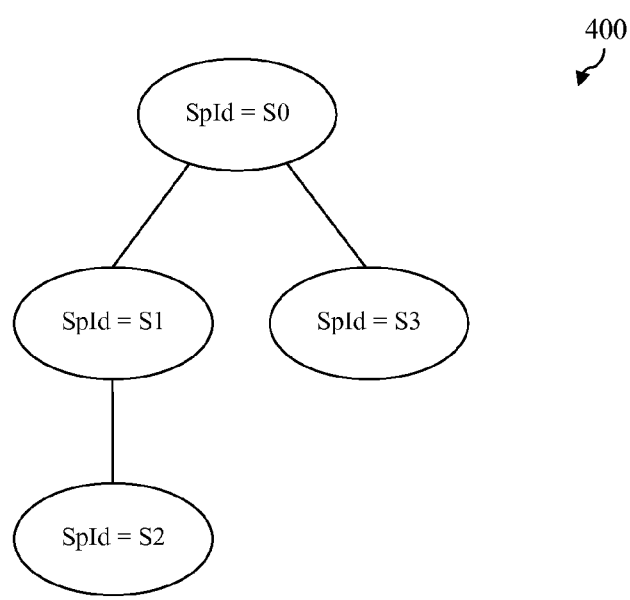
FIG. 4 is a diagram that illustrates a hierarchical relationship between the values of a Space ID attribute used to represent ad impressions in a display advertising system in accordance with an embodiment.

FIG. 4 is a diagram 400 that illustrates a Space ID attribute that also has values assigned thereto that are also interrelated in a hierarchical manner. A Space ID attribute may be used to identify a particular ad impression location. In the example of FIG. 4, it is shown that the Space ID ("SpId") attribute can have a hierarchy of values associated therewith, wherein the hierarchy of values may include but is not limited to the values S0, S1, S2 and S3. In the hierarchy illustrated in FIG. 4, the value S0 is the parent of values S1 and S3 and the value S1 is the parent of the value S2. In further accordance with such an embodiment, display advertising system 100 is configured such that, in the absence of any applicable inventory contribution rules, inventory associated with any child in the hierarchy shown in diagram 400 will contribute to, or be included among, the inventory associated with the parent of that child. Thus, for example, any ad impression at the location having a Space ID equal to S2 will be counted among the ad impressions available at the location having a SpaceID equal to S1. As another example, any ad impressions available at the location having a Space ID equal to S1 or S3 will be counted among the ad impressions available at the location having a Space ID equal to S0.

Attributes such as Custom Section and Space ID that can have values assigned thereto that are interrelated in a hierarchical manner may be referred to as "hierarchical" attributes. Attributes that cannot have values assigned thereto that are interrelated in a hierarchical manner may be referred to as "non-hierarchical" attributes.

In further accordance with the foregoing examples, certain attributes may comprise "single value" attributes while certain other attributes may comprise "multi-value" attributes. A single value attribute is one to which only a single value may be assigned for a given ad impression representation. For example, in an embodiment, the Network ID, Publisher ID, Site ID and SpaceID attributes discussed above each comprise single value attributes, in that each ad impression representation may only include a single value for each of these attributes. A multi-value attribute is one to which multiple values may be assigned for a given ad impression representation. For example, in an embodiment, the Custom Section attribute discussed above comprises a multi-value attribute, in that each ad impression representation may include one or more values for this attribute.

The use of a predefined set of attributes to represent ad impressions as discussed above facilitates a matching operation that is performed by admission control system 122 during the booking process. Such matching operation matches representations of booking queries submitted on behalf of an advertiser to representations of ad impressions forecasted by supply forecasting system 124 to determine if desired ad impressions are available for booking. The use of a predefined set of attributes to represent ad impressions as discussed above also facilitates a matching operation that is performed by ad serving system 106 during the ad serving process. Such matching operation matches representations of committed bookings to representations of ad impressions generated when users access Web pages via their Web-enabled electronic devices.

Figure 5:
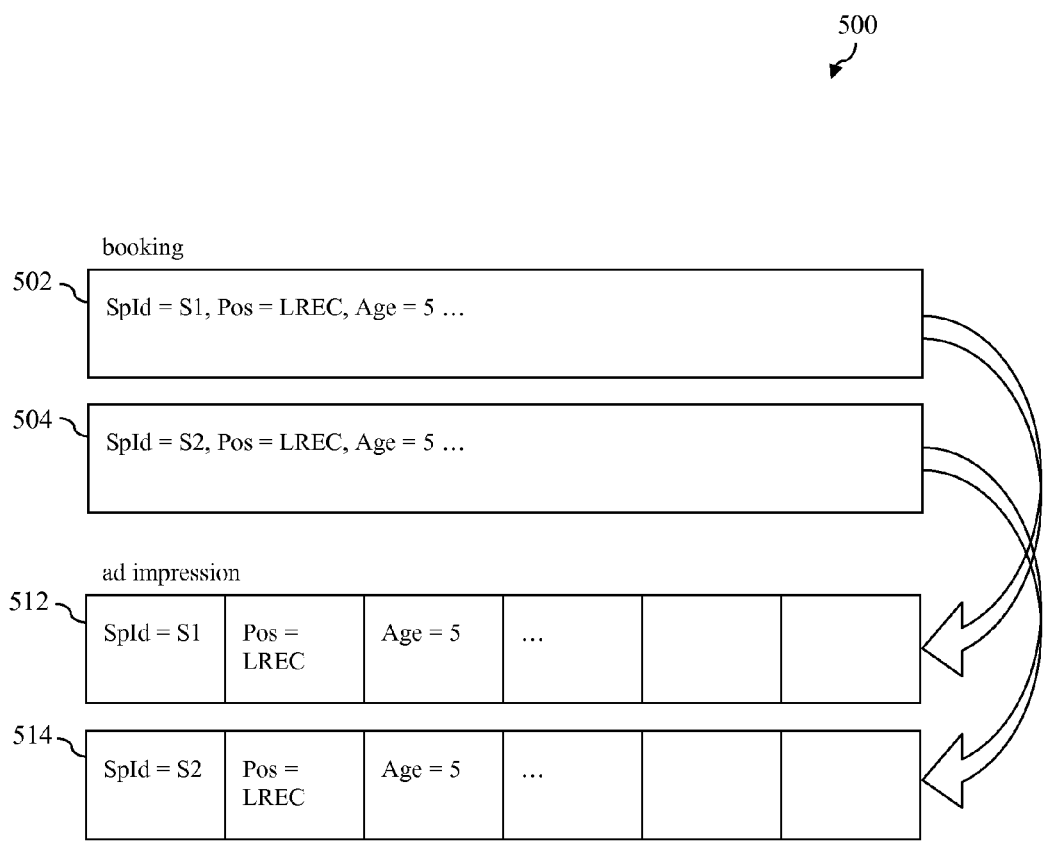
FIG. 5 is an illustration that shows how bookings are matched to ad impressions in a display advertising system in accordance with an embodiment.

FIG. 5 is an illustration 500 that shows how ad serving system 106 matches bookings to ad impressions in accordance with an embodiment. The same matching process that will now be described in reference to FIG. 5 may also be used by admission control system 122 in matching booking queries to forecasted ad impressions.

As shown in FIG. 5, a representation of a first booking 502 and a representation of a second booking 504 each includes a number of target attributes and associated target values. In the case of booking representation 502, the target attributes and target values include a Space ID ("SpId") attribute having a value of S1, a Position ("Pos") attribute having a value of LREC, and an Age attribute having a value of 5. In the case of booking representation 504, the target attributes and target values include a Space ID attribute having a value of S2, a Position attribute having a value of LREC and an Age attribute having a value of 5.

Ad serving system 106 attempts to match received ad impressions to bookings identified in the allocation plan received from inventory management system 104 in order to honor such bookings. To determine whether an ad impression matches a booking, ad serving system 106 compares the attributes and values used to represent the ad impression to the target attributes and target values specified in the representation of the booking. If the attributes and values used to represent the ad impression match or otherwise satisfy the target attributes and target values used to represent the booking, then the ad impression is said to match the booking. In such a case, ad serving system 106 may use the ad impression to serve an ad associated with the booking.

This matching process is further illustrated in FIG. 5. As shown in that figure, ad serving system 106 determines that an ad impression representation 512 matches booking representation 502 because ad impression representation 512 has attributes and values that match the target attributes and target values of booking representation 502. In particular, like booking representation 502, ad impression representation 512 has a Space ID attribute=S1, a Position attribute=LREC and an Age attribute=5. In contrast, ad impression representation 512 is deemed non-matching with respect to booking representation 504 because ad impression representation 512 has a SpaceID attribute=S1 while booking representation 504 has a SpaceID attribute=S2. As further shown in FIG. 5, ad serving system 106 determines that an ad impression representation 514 matches booking representation 504, because ad impression representation 514 has attributes and values that match the target attributes and target values of booking representation 504. In particular, like booking representation 504, ad impression representation 514 has a Space ID attribute=S2, a Position attribute=LREC and an Age attribute=5. In contrast, ad impression representation 514 is deemed non-matching with respect to booking representation 502 because ad impression representation 514 has a SpaceID attribute=S2 while booking representation 502 has a SpaceID attribute=S1.

To facilitate desired matching behaviors and to take into account inventory contribution rules, embodiments described herein modify representations of booking queries and bookings generated by demand application 112 as well as representations of ad impressions generated by ad serving system 106 and supply forecasting system 124. Such modification takes place prior to matching booking or booking query representations to ad impression representations. Such modification may also be referred to herein as "decoration."

Table 1, below, shows how representations of booking queries and bookings are decorated in accordance with an embodiment. The decoration of booking queries and bookings may be carried out, for example, by demand application 112 and/or admission control system 122 depending upon the implementation. The methodology represented in Table 1 is premised on the fact that certain attributes are deemed mandatory in order to properly perform matching and to account for inventory contribution rules. In one embodiment, the mandatory attributes include a Network ID attribute, a Publisher ID attribute, a Site ID attribute, and a Custom Section attribute. In certain embodiments, the mandatory attributes may further include a Space ID attribute.

As shown in Table 1, the manner in which a representation of a booking query or booking will be decorated will depend on the type(s) of mandatory attribute(s) included in the query: single value, single value (hierarchical), or multi-value (hierarchical). Examples of mandatory single value attributes include Network ID, Publisher ID and Site ID. An example of a mandatory single value (hierarchical) attribute is Space ID. An example of a mandatory multi-value (hierarchical) attribute is Custom Section.

TABLE 1

| Mandatory Attribute Type | Example | Attribute Exists | Attribute Does Not Exist |
|---|---|---|---|
| Single Value | Site ID | No Action | Add (attribute = Root) |
| Single Value (Hierarchical) | Space ID | No Action | Add (attribute = Root) |
| Multi-value (Hierarchical) | Custom Section | Create a new mandatory attribute and copy values and add Root | Create a new mandatory attribute = to Root |

In accordance with the methodology shown in Table 1, no decoration will be applied to a mandatory single value attribute for which a value is already specified in a booking query or booking, regardless of whether such single value attribute is hierarchical or non-hierarchical. In contrast, if no value is specified for a mandatory single value attribute in a booking query or booking, then the representation of the booking query or booking will be decorated such that the mandatory attribute is equal to Root, which is a universal parent for the mandatory attribute.

In further accordance with the methodology shown in Table 1, if a value is already specified for a mandatory multi-value hierarchical attribute in a booking query or booking, then a new mandatory attribute will be created and the values of the new mandatory attribute will be the same as the values of the relevant attribute plus the Root value. Thus, for example, if Custom Section is a mandatory multi-value hierarchical attribute and is specified as CS=CS1, CS2 in the booking or booking query, then a new mandatory attribute, which may be called CSm, is created. Values will be assigned to CSm such that CSm=CS1, CS2, Root.

In still further accordance with the methodology shown in Table 1, if a value is not specified for a mandatory multi-value hierarchical attribute in a booking query or booking, then a new mandatory attribute will be created and the Root value will be assigned thereto. Thus, for example, if Custom Section is a mandatory multi-value hierarchical attribute for which no value is assigned in the booking or booking query, then a new mandatory attribute, which may be called CSm, is created. The Root value will be assigned to CSm such that CSm=Root.

Additional examples of the manner in which representations of booking queries and bookings are decorated in accordance with an embodiment are set forth in Table 2 below.

TABLE 2

| Booking Representation | Decorated Booking Representation |
|---|---|
| NetId = N1, PubId = P1, SiteId = S1, CT = CT1 | NetId = N1, PubId = P1, SiteId = S1, CT = CT1, CSm = Root |
| NetId = N1, PubId = P1, SiteId = S1, CT = CT1, CS = CS2 | NetId = N1, PubId = P1, SiteId = S1, CT = CT1, CS = CS2, CSm = (CS2, Root) |
| NetId = N1, PubId = P1, SiteId = S1, CT = CT1, CS = ~CS2 | NetId = N1, PubId = P1, SiteId = S1, CT = CT1, CS == ~CS2, CSm = Root |
| NetId = N1, PubId = P1, CT = CT1 | NetId = N1, PubId = P1, SiteId = Root, CT = CT1, CSm = Root |
| NetId = N1, CT = CT1 | NetId = N1, PubId = Root, SiteId = Root, CT = CT1, CSm = Root |
| NetId = N1, PubId = P1, SiteId = S1, CT = CT1, CS = (CS1, CS2) | NetId = N1, PubId = P1, SiteId = S1, CT = CT1, CS = (CS1, CS2), CSm = (CS1, CS2, Root) |

In the third example in Table 2, the booking representation specifies that CS=~CS2. This means that the Custom Section attribute should be a value other than CS2. In this case, the new mandatory attribute, CSm, is set to be equal to the Root value only.

Table 3, below, shows how representations of ad impressions are decorated in accordance with an embodiment. The decoration of ad impressions may be carried out, for example, by ad serving system 106 as well as supply forecasting system 124. The methodology represented in Table 3 is also premised on the fact that certain attributes are deemed mandatory in order to properly perform matching and to account for inventory contribution rules. As shown in Table 3, different types of mandatory attributes are decorated in different ways.

TABLE 3

| Mandatory Attribute Type | Example | Action |
|---|---|---|
| Single Value | Site ID | Add Root if no Inventory Contribution Rule |
| Single Value (Hierarchical) | Space ID | Parent marking (including Root) until a matching Inventory Contribution Rule is reached |
| Multi-value (Hierarchical) | Custom Section | Parent marking as normal; create new mandatory attribute (details provided below) |

In accordance with the methodology shown in Table 3, the Root value will be added to any mandatory single value non-hierarchical attribute. Thus, for example, if a representation of an ad impression specifies that Site ID ("SiteId") equals S1 and there is no inventory contribution rule associated with S1, then the ad impression representation will be decorated such that SiteId=S1, Root.

In further accordance with the methodology shown in Table 3, for mandatory single value hierarchical attributes, decoration is carried out by performing a parent marking process that takes into account inventory contribution rules. In accordance with the parent marking process, the value that is assigned to the mandatory single value hierarchical attribute is identified. Then, one or more additional values are selectively assigned to the relevant attribute by traversing a hierarchy of values associated with the hierarchical single value attribute starting with the identified value and progressing up the hierarchy until a value is reached that is associated with an inventory contribution rule or until a Root value is reached.

This parent marking process may be further clarified by referring again to FIG. 4. Assume that an ad impression is received that has a SpaceID ("SpId")=S2. Assume also that there are no inventory contribution rules associated with any of SpId=S2, S1, or S0. In this case, the parent marking process referred to above will decorate the SpaceId attribute such that SpId=S2, S1, S0, Root. This is achieved by traversing the hierarchy shown in FIG. 4 from S2 to S1, from S1 to S0, and from S0 to Root (not shown in FIG. 4), which is the parent of S0.

Now assume that the value S1 has an inventory contribution rule associated therewith, such that S1 should not contribute to S0. In this case, the parent marking process referred to above will decorate the SpaceID attribute such that SpId=S2, S1. This is achieved by traversing the hierarchy shown in FIG. 4 from S2 to S1 and then stopping at S1 because of the inventory contribution rule associated with S1.

In still further accordance with the methodology shown in Table 3, for mandatory multi-value hierarchical attributes, decoration is carried out as follows. First, the values assigned to the mandatory multi-value hierarchical attribute are identified. Then, one or more additional values are assigned to the mandatory multi-value hierarchical attribute by performing the previously-described parent marking process for each identified value. In addition, a new mandatory attribute is created and assigned one or more values in accordance with the following: (1) first, it is determined whether an inventory contribution rule is associated with any of the identified values or with any parent value of any of the identified values; (2) in response to determining that there are no inventory contribution rules associated with any of the identified values or with any parent value of any of the identified values, only the Root value is assigned to the new mandatory attribute; and (3) in response to determining that there is an inventory contribution rule associated with at least one of the identified values or with at least one parent value of one of the identified values, assigning one or more values to the new mandatory attribute by traversing the hierarchy of values associated with the hierarchical multi-value attribute starting with each identified value associated with an inventory contribution rule or having a parent value associated with an inventory contribution rule and progressing up the hierarchy until a value associated with an inventory contribution rule is reached.

The process described above for decorating mandatory multi-value hierarchical attributes may be further clarified by referring again to FIG. 3. Assume that an ad impression is received that has a Custom Section ("CS")=CS2, CS3. In this case, the decoration process referred to above will decorate the Custom Section attribute such that CS=CS2, CS1, CS0, Root, CS3, [CS0, Root]. This is achieved by traversing the hierarchy shown in FIG. 3 from CS2 up to the Root (not shown in FIG. 3), which is the parent of CS0, and then traversing the same hierarchy again from CS3 up to the Root. Inventory contribution rules are not taken into consideration during this parent marking process.

Now assume also that there are no inventory contribution rules associated with any of CS=CS3, CS2, CS1, or CS0. In this case, a new mandatory attribute, which may be referred to as CSm, will be created and will be assigned the value Root, such that CSm=Root.

A different result is achieved if there is an inventory contribution rule associated with one of the Custom Section values. For example, assume that there is an inventory contribution rule associated with CS1 such that CS1 should not contribute to CS0. In this case, the new mandatory attribute CSm will be assigned values such that CSm=CS2, CS1. This is because, in accordance with the process set forth above, only the branch of the hierarchy having an inventory contribution rule associated therewith is traversed and it is only traversed up to the value having the inventory contribution rule. Thus, in the case, the values of CSm are determined by traversing from CS2 to CS1 and then stopping at CS1 because of the inventory contribution rule associated with CS1. No traversal occurs starting with CS3 because that branch of the hierarchy does not have any inventory contribution rules associated with it.

Various examples will now be provided that will demonstrate how the aforementioned decoration processes result in desired matching behavior and proper accounting for inventory contribution rules. These examples are provided by way of illustration only and are not intended to be limiting.

Example 1

Assume that a booking B1 is represented as:
NetId=N1; PubId=P1.
Booking B1 may be, for example, a run of publisher booking. Via the decoration process discussed above, booking B1 is modified such that it is represented as:
NetId=N1; PubId=P1; SiteId=Root; CSm=Root.
Now assume that an ad impression A1 is received having the following attributes and associated values:
NetId=N1; PubId=P1; SiteId=S1; CS=CS2.
Also assume the hierarchy of Custom Section values shown in FIG. 4 and that there are no inventory contribution rules associated with ad impression A1. In this case, ad impression A1 is modified by the decoration process discussed above such that its attributes and associated values include:
NetId=N1, Root; PubId=P1, Root, SiteId=S1, Root;
CS=CS2, CS1, CS0, Root; CSm=Root.
In this example, ad impression A1 will match booking B1, even though booking B1 does not specify a specific Site ID or any Custom Sections.

Example 2

Assume that a booking B2 is represented as:
NetId=N1; PubId=P1; SiteId=S1; CS=CS0.
Booking B2 may be, for example, a run of section booking. Also assume the hierarchy of custom section values shown in FIG. 4. Via the decoration process discussed above, booking B2 is modified such that it is represented as:
NetId=N1; PubId=P1; SiteId=S1; CS=CS0; CSm=CS0, Root.
Now assume that an ad impression A2 is received having the following attributes and associated values:
NetId=N1; PubId=P1; SiteId=S1; and CS=CS2.
Also assume that there is an inventory contribution rule associated with CS1 because CS1 is deemed premium content. In this case, ad impression A2 is modified by the decoration process discussed above such that it is represented as:
NetId=N1, Root; PubId=P1, Root, SiteId=S1, Root;
CS=CS2, CS1, CS0, Root; CSm=CS2, CS1.
In this example, ad impression A2 will not match booking B2. This is because of the mismatch associated with mandatory attribute CSm. Thus, the inventory contribution rule associated with premium section CS1 successfully prevents an ad impression in a child of that section (i.e., CS2) from contributing to the ad impressions in section CS0.

Example 3

Assume that a booking B3 is represented as:
NetId=N1; PubId=P1; SiteId=S1; CS=CS2;
with the additional constraint that
CS=CS3.
This additional constraint essentially means that CS should be CS2 and CS3. Also assume the hierarchy of custom section values shown in FIG. 4. Via the decoration process discussed above, booking B3 is modified such that it is represented as:
NetId=N1; PubId=P1; SiteId=S1; CS=CS2; CSm=CS2, Root;
with the additional constraint that
CS=CS3.
Now assume that an ad impression A3 is received that is represented as:
NetId=N1; PubId=P1; SiteId=S1; and CS=CS2, CS3.
Also assume that there is an inventory contribution rule associated with CS1 because CS1 is deemed premium content. In this case, ad impression A3 is modified by the decoration process discussed above such that it is represented as:
NetId=N1, Root; PubId=P1, Root, SiteId=S1, Root;
CS=CS2, CS1, CS0, CS3, Root; CSm=CS2, CS1.
In this example, ad impression A3 will match booking B3. In part, this is because there is a match between both the CS and CSm attributes. This is the desired result since booking B3 specifically targets the premium content on Custom Section CS2.

The foregoing Example 3 illustrates why the new mandatory attribute CSm is required in order to ensure proper matching behavior. If the method did not utilize CSm, then two possible approaches for decorating ad impression A3 could be used. In a first approach, the parent marking process is applied to the CS attribute until a matching inventory contribution rule is reached and branches of the hierarchy with no inventory contribution rules are ignored. In this case, booking B3 will have
CS=CS2, Root;
and the additional constraint CS=CS3, while ad impression A3 will have
CS=CS2, CS1.
The result would be that no match will occur because ad impression A3 does not have CS=CS3. This is not the desired result.

In a second approach, the parent marking process is applied to the CS attribute until a matching inventory contribution rule or the Root value is reached. In this case, booking B3 will have
CS=CS2, Root;
and the additional constraint CS=CS3, while ad impression A3 will have
CS=CS2, CS1, CS0, CS3, Root.
The result would be that a match would occur, but ad impression A3 would also be eligible for a booking that only specified CS=CS3 which is not a desired result.

Figure 6:
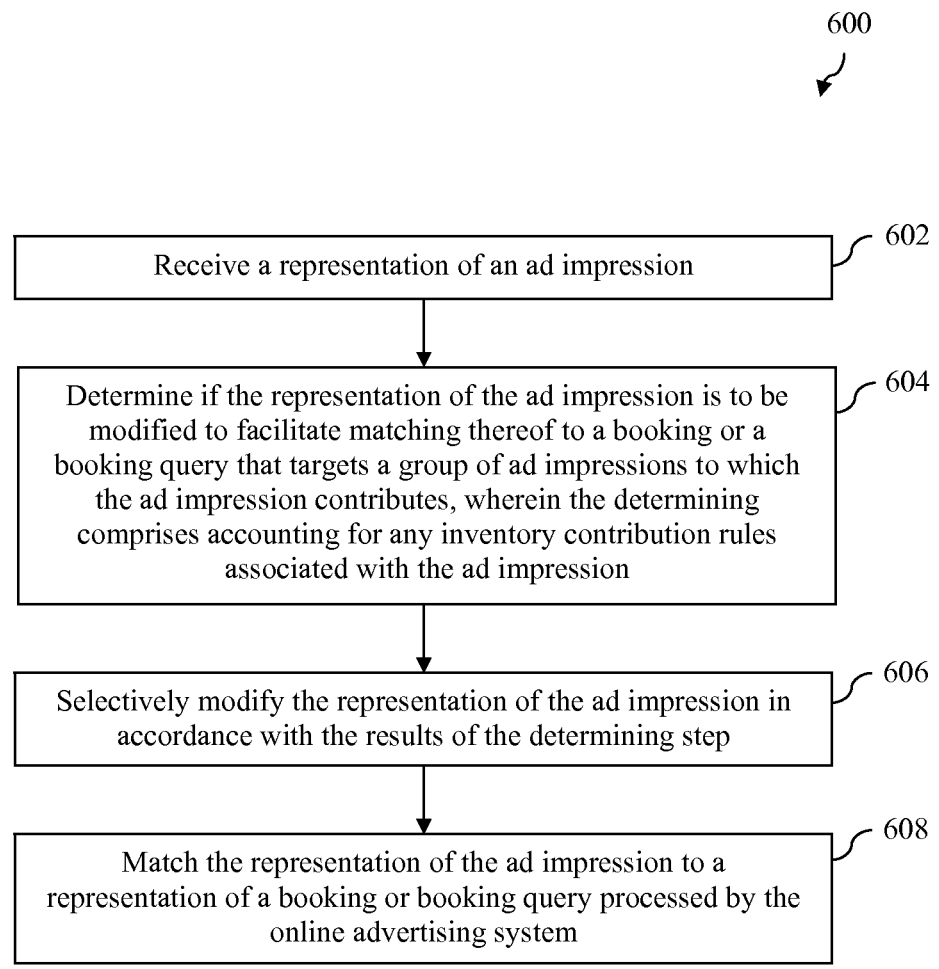
FIG. 6 depicts a flowchart of a method for performing inventory management in an online advertising system in accordance with an embodiment.

A generalized description of the foregoing techniques will now be provided in reference to FIGS. 6-13. In particular, FIG. 6 depicts a flowchart 600 of a method for performing inventory management in an online advertising system in accordance with an embodiment. The method of flowchart 600 may be performed, for example, by display advertising system 100 as described above in reference to FIG. 1. However, the method is not limited to that implementation and may be performed by other systems as well.

As shown in FIG. 6, the method of flowchart 600 begins at step 602, in which a representation of an ad impression is received.

At step 604, it is determined if the representation of the ad impression is to be modified to facilitate matching thereof to a booking or a booking query that targets a group of ad impressions to which the ad impression contributes, wherein the determining step comprises accounting for any inventory contribution rules associated with the ad impression.

At step 606, the representation of the ad impression is selectively modified in accordance with the results of step 604.

At step 608, the representation of the ad impression is matched to a representation of a booking or booking query processed by the online advertising system.

In an embodiment in which the foregoing method is implemented by display advertising system 100, the receipt and selective modification of a representation of an ad impression as set forth in steps 602, 604 and 606 may be carried out, for example, by supply forecasting system and/or admission control system 122 to facilitate a booking process and/or may be carried out by ad serving system 106 to facilitate an ad serving process. In further accordance with such an embodiment, the matching that occurs in step 608 may be carried out by admission control system 122 to facilitate the booking process and/or by ad serving system 106 to facilitate the ad serving process.

Figure 7:
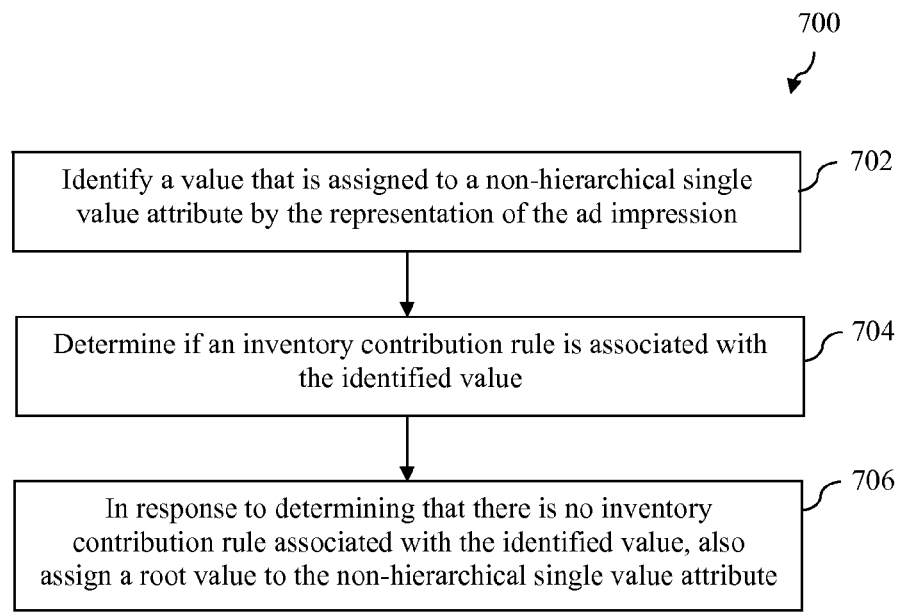
FIG. 7 depicts a flowchart of a method by which a representation of an ad impression may be selectively modified in accordance with an embodiment.

FIG. 7 depicts a flowchart 700 of a method by which the selective modification of a representation of an ad impression as described in step 606 of flowchart 600 may be carried out in one embodiment. The method of flowchart 700 is intended to encompass the logic described in the first row of Table 3, discussed above, although it is not intended to be limited thereby.

As shown in FIG. 7, the method of flowchart 700 begins at step 702 in which a value that is assigned to a non-hierarchical single value attribute by the representation of the ad impression is identified. For example, this step may involve identifying a value that is assigned to any of the Network ID, Publisher ID or Site ID attributes described above.

At step 704, it is determined if an inventory contribution rule is associated with the value that was identified during step 702.

At step 706, in response to determining that there is no inventory contribution rule associated with the value that was identified during step 702, a root value is also assigned to the non-hierarchical single value attribute.

Figure 8:
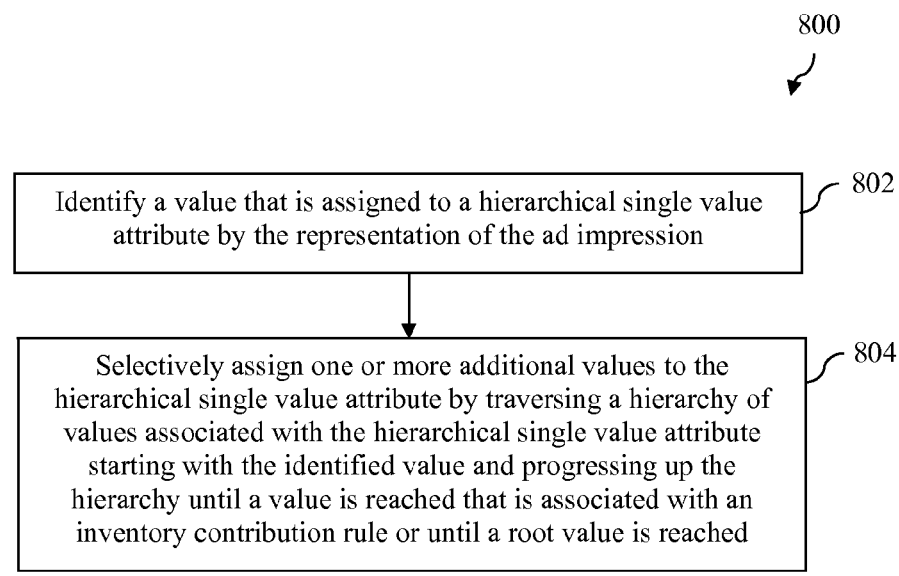
FIG. 8 depicts a flowchart of a further method by which a representation of an ad impression may be selectively modified in accordance with an embodiment.

FIG. 8 depicts a flowchart 800 of a further method by which the selective modification of a representation of an ad impression as described in step 606 of flowchart 600 may be carried out in one embodiment. The method of flowchart 800 is intended to encompass the logic described in the second row of Table 3, discussed above, although it is not intended to be limited thereby.

As shown in FIG. 8, the method of flowchart 800 begins at step 802 in which a value that is assigned to a hierarchical single value attribute by the representation of the ad impression is identified. For example, this step may involve identifying a value that is assigned to the above-described Space ID attribute.

At step 804, one or more additional values are selectively assigned to the hierarchical single value attribute by traversing a hierarchy of values associated with the hierarchical single value attribute starting with the value that was identified during step 802 and progressing up the hierarchy until a value that is reached that is associated with an inventory contribution rule or until a root value is reached.

Figure 9:
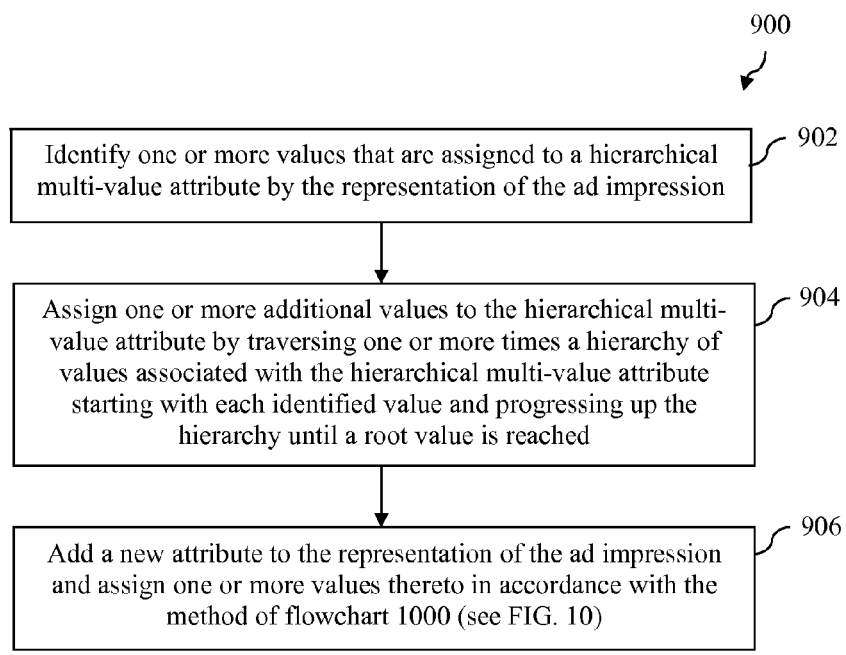
FIG. 9 depicts a flowchart of a still further method by which a representation of an ad impression may be selectively modified in accordance with an embodiment.

FIG. 9 depicts a flowchart 900 of a still further method by which the selective modification of a representation of an ad impression as described in step 606 of flowchart 600 may be carried out in one embodiment. The method of flowchart 900 is intended to encompass the logic described in the third row of Table 3, discussed above, although it is not intended to be limited thereby.

As shown in FIG. 9, the method of flowchart 900 begins at step 902 in which one or more values that are assigned to a hierarchical multi-value attribute by the representation of the ad impression are identified. For example, this step may involve identifying one or more values that are assigned to the above-described Custom Section attribute.

At step 904, one or more additional values are assigned to the hierarchical multi-value attribute by traversing one or more times a hierarchy of values associated with the hierarchical multi-value attribute starting with each identified value and progressing up the hierarchy until a root value is reached.

Figure 10:
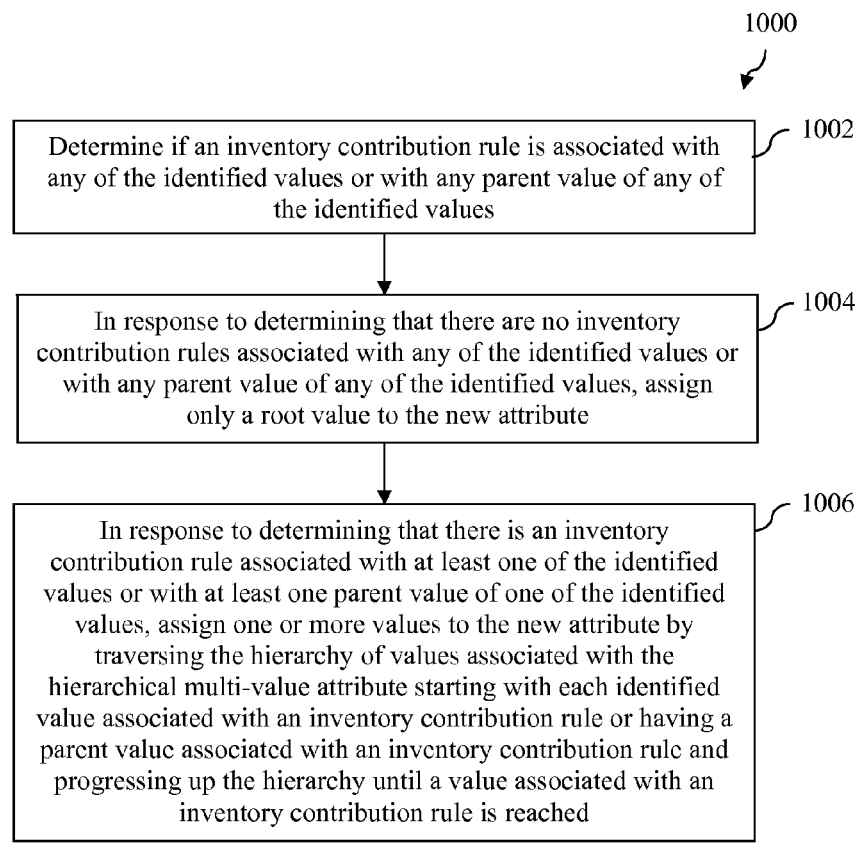
FIG. 10 depicts a flowchart of a method for assigning values to a new attribute added to a representation of an ad impression in accordance with an embodiment.

At step 906, a new attribute is added to the representation of the ad impression and one or more values are assigned to the new attribute in accordance with a method shown in flowchart 1000 of FIG. 10. This method will now be described.

As shown in FIG. 10, the method of flowchart 1000 begins at step 1002 in which it is determined if an inventory contribution rule is associated with any of the values identified during step 902 of flowchart 900 or any parent value of any of the identified values.

At step 1004, in response to determining that there are no inventory contribution rules associated with any of the values identified during step 902 of flowchart 900 or any parent value of any of the identified values, only a root value is assigned to the new attribute.

At step 1006, in response to determining that there is an inventory contribution rules associated with at least one of the values identified during step 902 of flowchart 900 or with at least one parent value of one of the identified values, one or more values are assigned to the new attribute by traversing the hierarchy of values associated with the hierarchical multi-value attribute starting with each identified value associated with an inventory contribution rule or having a parent value associated with an inventory contribution rule and progressing up the hierarchy until a value associated with an inventory contribution rule is reached.

The method of flowchart 600 as described above in reference to FIG. 6 may further include modifying the representation of the booking or the booking query prior to the matching step. Various ways in which the representation of the booking or the booking query may be modified will now be described.

Figure 11:
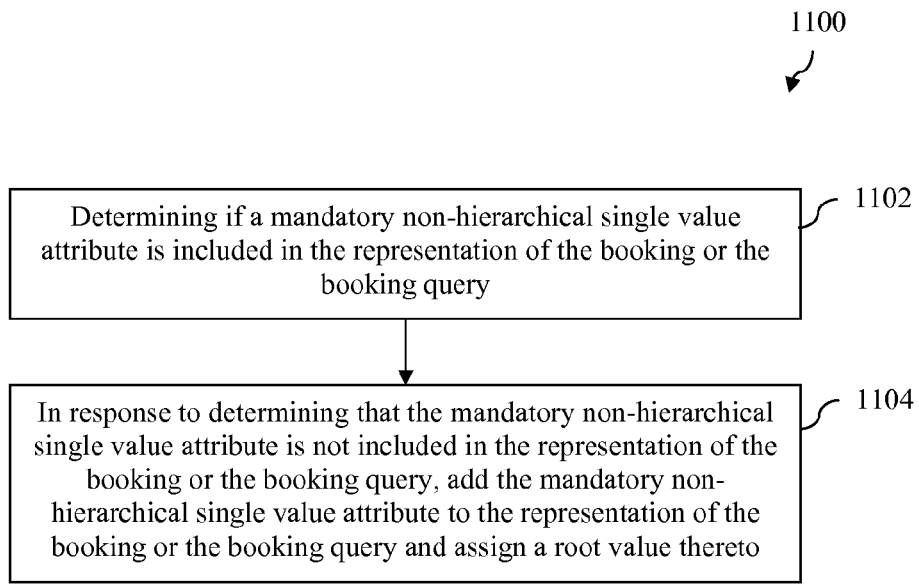
FIG. 11 depicts a flowchart of a method by which a representation of a booking or a booking query may be modified in accordance with an embodiment.

FIG. 11 depicts a flowchart 1100 of a method by which a representation of a booking or booking query may be modified in one embodiment. The method of flowchart 1100 is intended to encompass the logic described in the first row of Table 1, discussed above, although it is not intended to be limited thereby.

As shown in FIG. 11, the method of flowchart 1100 begins at step 1102 in which it is determined if a mandatory non-hierarchical single value attribute is included in the representation of the booking or the booking query. This step may involve, for example, determining if one of the Network ID, Publisher ID, or Site ID attributes described above is included in the representation of the booking or the booking query.

At step 1104, in response to determining that the mandatory non-hierarchical single value attribute is not included in the representation of the booking or the booking query, the mandatory non-hierarchical single value attribute is added to the representation of the booking or the booking query and a root value is assigned thereto.

Figure 12:
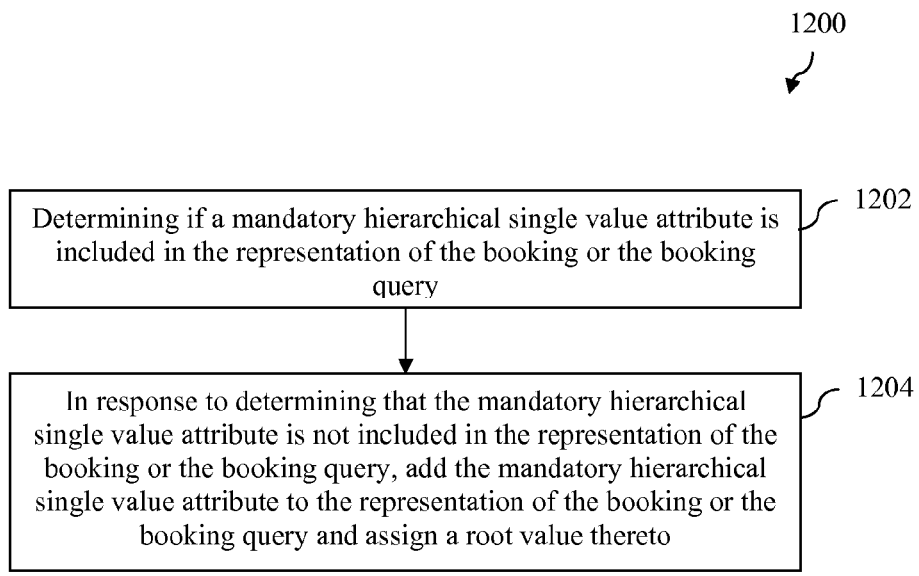
FIG. 12 depicts a flowchart of a further method by which a representation of a booking or a booking query may be modified in accordance with an embodiment.

FIG. 12 depicts a flowchart 1200 of a further method by which a representation of a booking or booking query may be modified in one embodiment. The method of flowchart 1200 is intended to encompass the logic described in the second row of Table 1, discussed above, although it is not intended to be limited thereby.

As shown in FIG. 12, the method of flowchart 1200 begins at step 1202 in which it is determined if a mandatory hierarchical single value attribute is included in the representation of the booking or the booking query. This step may involve, for example, determining if the above-described Space ID attribute is included in the representation of the booking or the booking query.

At step 1204, in response to determining that the mandatory hierarchical single value attribute is not included in the representation of the booking or the booking query, the mandatory hierarchical single value attribute is added to the representation of the booking or the booking query and a root value is assigned thereto.

Figure 13:
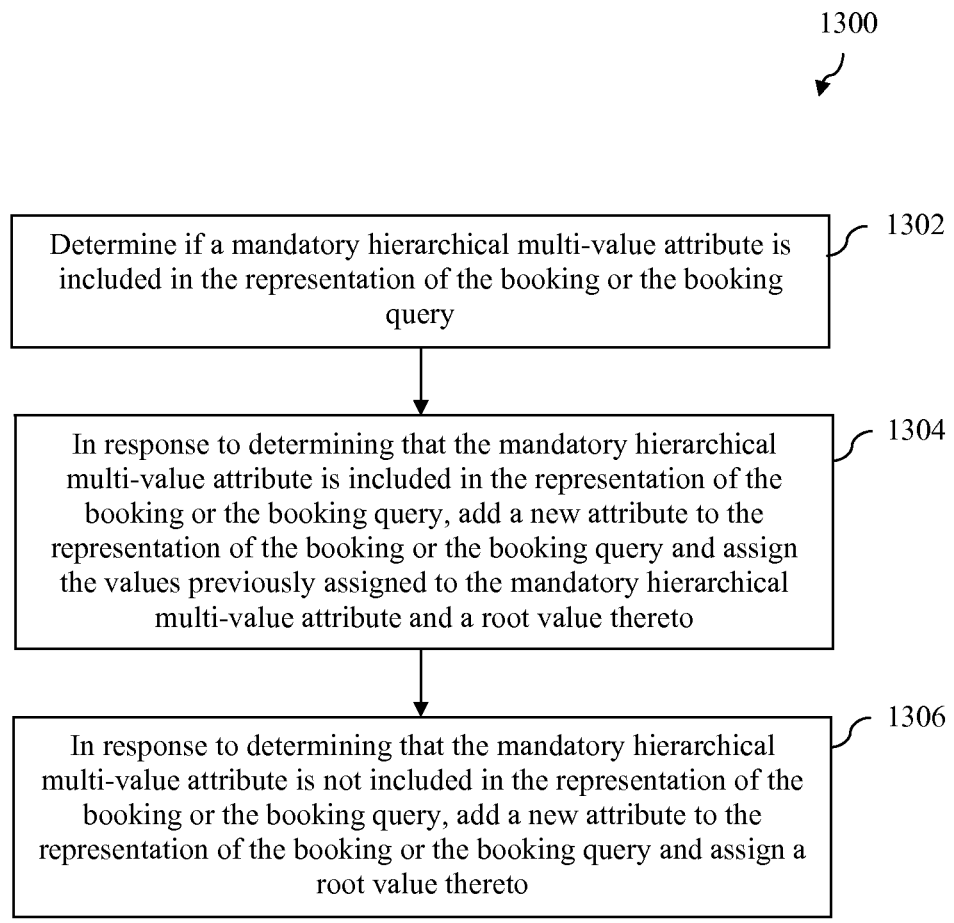
FIG. 13 depicts a flowchart of a still further method by which a representation of a booking or a booking query may be modified in accordance with an embodiment.

FIG. 13 depicts a flowchart 1300 of a still further method by which a representation of a booking or booking query may be modified in one embodiment. The method of flowchart 1300 is intended to encompass the logic described in the third row of Table 1, discussed above, although it is not intended to be limited thereby.

As shown in FIG. 13, the method of flowchart 1300 begins at step 1302 in which it is determined if a mandatory hierarchical multi-value attribute is included in the representation of the booking or the booking query. This step may involve, for example, determining if the above-described Custom Section attribute is included in the representation of the booking or the booking query.

At step 1302, in response to determining that the mandatory hierarchical multi-value attribute is included in the representation of the booking or the booking query, a new mandatory attribute is added to the representation of the booking or the booking query and assigned the values that were previously assigned to the mandatory hierarchical multi-value attribute as well as a root value.

At step 1304, in response to determining that the mandatory hierarchical multi-value attribute is not included in the representation of the booking or the booking query, a new mandatory attribute is added to the representation of the booking or the booking query and assigned a root value.

D. Example Interface for Specifying Inventory Contribution Rules

As noted above, supply application 114 enables publishers or agents thereof to specify inventory contribution rules in association with selected groups of ad impressions. For example and without limitation, a publisher or agent thereof may interact with supply application 114 to create an inventory contribution rule that is associated with ad impressions located on a particular publisher network, a particular Web site, and/or a particular section of a Web site. In accordance with further embodiments, inventory contribution rules can be specified for specific ad sizes and for specific ad positions. Furthermore, inventory contribution rules can be specified to have a particular duration. Such duration may be selected in a variety of ways, including but not limited to selecting a particular date range.

In the embodiment shown in FIG. 1, inventory contribution rules that are created by a publisher or agent thereof are stored in campaign log 116. Such inventory contribution rules are also distributed to supply forecasting system 124 so that they may be used in the process of decorating forecasted ad impressions and to ad serving system 106 so that they can be used in the process of decorating actual ad impressions.

E. Example Computer System Implementation

Application 102, inventory management system 104, ad serving system 106, and any of the sub-systems or components contained therein may be implemented in hardware, software, firmware, or any combination thereof. For example, application 102, inventory management system 104, ad serving system 106 and any of the sub-systems or components contained therein may be implemented as computer program code configured to be executed in one or more processors. Alternatively, application 102, inventory management system 104, ad serving system 106 and any of the sub-systems or components contained therein may be implemented as hardware logic/electrical circuitry.

Figure 14:
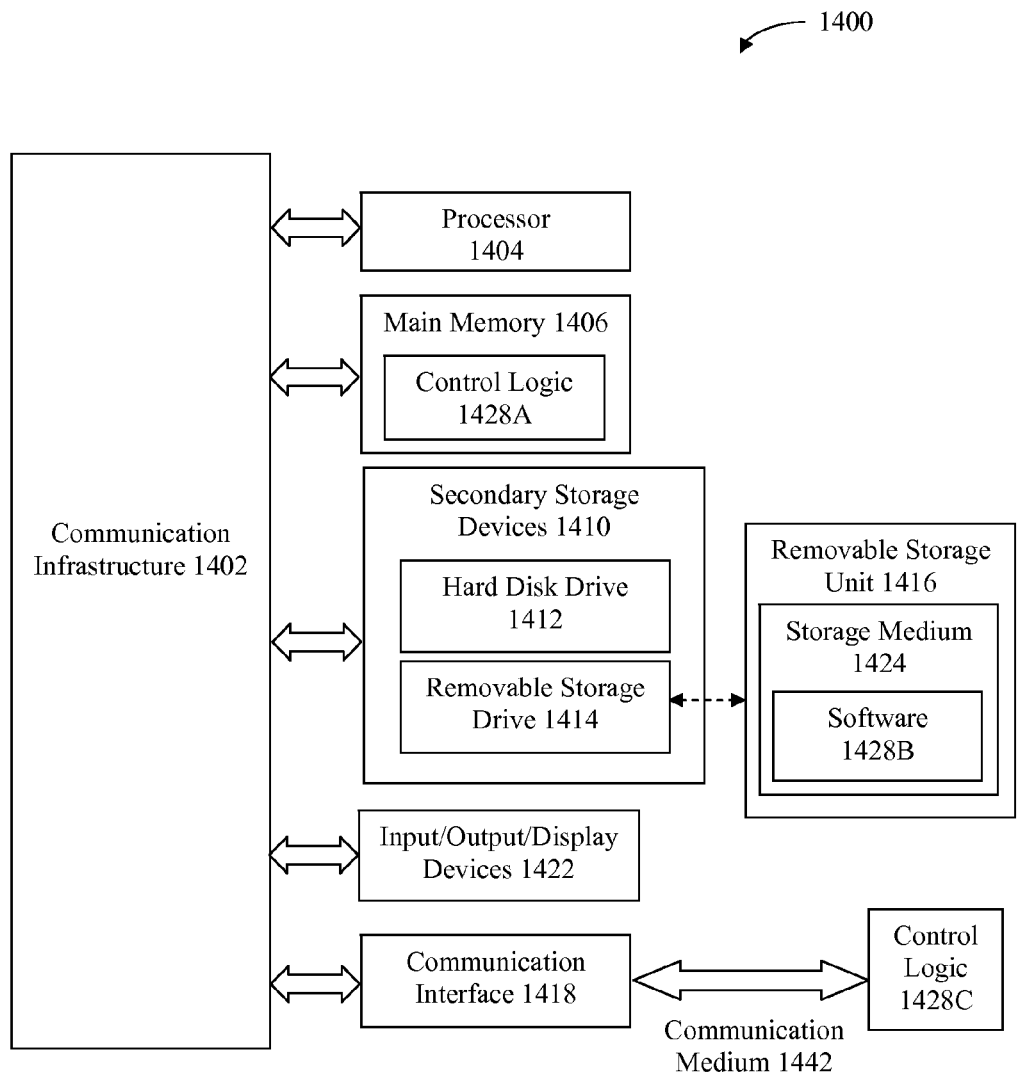
FIG. 14 is a block diagram of a computer system that may be used to implement one or more aspects of the present invention.

The embodiments described herein, including systems, methods/processes, and/or apparatuses, may be implemented using well known servers/computers, such as a computer 1400 shown in FIG. 14. For example, application 102, inventory management system 104, ad serving system 106 and any of the sub-systems or components contained therein may be implemented using one or more computers 1400.

Computer 1400 can be any commercially available and well known computer capable of performing the functions described herein, such as computers available from International Business Machines, Apple, Sun, HP, Dell, Cray, etc. Computer 1400 may be any type of computer, including a desktop computer, a server, etc.

Computer 1400 includes one or more processors (also called central processing units, or CPUs), such as a processor 1404. Processor 1404 is connected to a communication infrastructure 1402, such as a communication bus. In some embodiments, processor 1404 can simultaneously operate multiple computing threads.

Computer 400 also includes a primary or main memory 1406, such as random access memory (RAM). Main memory 1406 has stored therein control logic 1428A (computer software), and data.

Computer 1400 also includes one or more secondary storage devices 1410. Secondary storage devices 1410 include, for example, a hard disk drive 1412 and/or a removable storage device or drive 1414, as well as other types of storage devices, such as memory cards and memory sticks. For instance, computer 1400 may include an industry standard interface, such a universal serial bus (USB) interface for interfacing with devices such as a memory stick. Removable storage drive 1414 represents a floppy disk drive, a magnetic tape drive, a compact disk drive, an optical storage device, tape backup, etc.

Removable storage drive 1414 interacts with a removable storage unit 1416. Removable storage unit 1416 includes a computer useable or readable storage medium 1424 having stored therein computer software 1428B (control logic) and/or data. Removable storage unit 1416 represents a floppy disk, magnetic tape, compact disk, DVD, optical storage disk, or any other computer data storage device.

Removable storage drive 1414 reads from and/or writes to removable storage unit 1416 in a well known manner.

Computer 1400 also includes input/output/display devices 1422, such as monitors, keyboards, pointing devices, etc.

Computer 1400 further includes a communication or network interface 1418. Communication interface 1418 enables computer 1400 to communicate with remote devices. For example, communication interface 1418 allows computer 1400 to communicate over communication networks or mediums 1442 (representing a form of a computer useable or readable medium), such as LANs, WANs, the Internet, etc. Communication interface 1418 may interface with remote sites or networks via wired or wireless connections.

Control logic 1428C may be transmitted to and from computer 1400 via the communication medium 1442.

Any apparatus or manufacture comprising a computer useable or readable medium having control logic (software) stored therein is referred to herein as a computer program product or program storage device. This includes, but is not limited to, computer 1400, main memory 1406, secondary storage devices 1410, and removable storage unit 1416. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, and ROM devices. Such computer-readable storage media may store program modules that include computer program logic for implementing the features of application 102, inventory management system 104, ad serving system 106 and any of the sub-systems or components contained therein, any of the methods or steps of the flowcharts of FIGS. 6-13, and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:
receiving, with ad serving circuitry, an ad impression representation of an ad impression generated in response to a user accessing a web page via a web-enabled electronic device, the ad impression representation comprising a set of attributes and associated values, wherein the set of attributes comprises a site identifier (ID) that identifies a web site within which the ad impression is located and a custom section ID that identifies a section of the web site within which the ad impression is located, wherein the custom section ID is a multi-value hierarchical attribute associated with multiple custom section values;
identifying, with the ad serving circuitry, the multiple custom section values associated with the custom section ID;
determining, with the ad serving circuitry, that a custom section value of the multiple custom section values is associated with an inventory contribution rule that indicates that the ad impression located within the section of the web site identified by the custom section value does not contribute to a parent value of the custom section value;
in response to the determining, modifying, with the ad serving circuitry, the set of attributes by adding a new custom section multi-value attribute to the set of attributes;
identifying, with the ad serving circuitry, which of the multiple custom section values to assign to the new custom section multi-value attribute by traversing a branch of the multi-value hierarchical attribute that includes the custom section value, wherein the traversing starts with a child of the custom section value and proceeds up the branch until the custom section value is reached, wherein the traversing identifies at least the child and the custom section value;
assigning, with the ad serving circuitry, at least the child and the custom section value identified during the traversing with the new custom section multi-value attribute; and
matching, with the ad serving circuitry, the modified set of attributes of the ad impression representation with booking attributes of a booking to determine whether to serve an online advertisement associated with the booking over a network for display of the online advertisement according to the ad impression.

2. The method of claim 1, further comprising:
identifying, with the ad serving circuitry, that no inventory contribution rule is associated with the site ID; and
in response to the identifying, assigning a root value to the side ID.

3. The method of claim 1, wherein the set of attributes further comprises a space ID, wherein the inventory contribution rule comprises a first inventory contribution rule, and wherein the method further comprises:
identifying, with the ad serving circuitry, a first space ID value that is assigned to the space ID; and
assigning, with the ad serving circuitry, an additional space ID value to the space ID by traversing a hierarchy of space ID values associates with the space ID starting with the first space ID value and progressing up the hierarchy until a second space ID value is reached that is associated with a second inventory contribution rule or until a root value is reached.

4. The method of claim 1, further comprising:
receiving, with ad serving circuitry, a second ad impression representation of a second ad impression, the ad impression representation comprising a second site ID and a second custom section ID;
identifying, with the ad serving circuitry, multiple custom section values associated with the second custom section ID; and
determining, with the ad serving circuitry, that none of the multiple custom section values is associated with any inventory contribution rule; and
in response to the determining, assigning only a root value to the second custom section ID.

5. The method of claim 1, further comprising modifying, with the ad serving circuitry, the booking prior to determining that the custom section value is associated with the inventory contribution rule.

6. The method of claim 5, wherein modifying the booking comprises:
determining, with the ad serving circuitry, if a mandatory non-hierarchical single value attribute is included in the booking;
in response to determining that the mandatory non-hierarchical single value attribute is not included in the booking, adding, with the ad serving circuitry, the mandatory single value attribute to the booking and assigning a root value thereto.

7. The method of claim 6, wherein the determining if the mandatory non-hierarchical single value attribute is included in the booking comprises determining, with the ad-serving circuitry, if a network ID attribute, a publisher ID attribute, a website ID attribute, or any combination thereof is included in the booking.

8. The method of claim 5, wherein modifying the booking comprises:
determining, with the ad serving circuitry, if a mandatory hierarchical single value attribute is included in the booking; and
in response to determining that the mandatory hierarchical single value attribute is not included in the booking, adding, with the ad serving circuitry, the mandatory hierarchical single value attribute to the booking and assigning a root value thereto.

9. The method of claim 8, wherein the determining if the mandatory hierarchical single value attribute is included in the booking comprises determining, with the ad serving circuitry, if a space ID attribute is included in the booking.

10. The method of claim 5, wherein modifying the booking comprises:
determining, with the ad serving circuitry, if a mandatory hierarchical multi-value attribute is included in the booking;
in response to determining that the mandatory hierarchical multi-value attribute is included in the booking, adding a new mandatory attribute to the booking and assigning values previously assigned to the mandatory hierarchical multi-value attribute and a root value thereto; and
in response to determining that the mandatory hierarchical multi-value attribute is not included in the booking, adding a new mandatory attribute to the booking and assigning a root value thereto.

11. The method of claim 10, wherein the determining if the mandatory hierarchical multi-value attribute is included in the booking includes determining if a custom section identifier attribute is included in the booking.

12. A display advertising system comprising:
a processor configured to:
receive an ad impression representation of an ad impression generated in response to a user accessing a web page via a web-enabled electronic device, the ad impression representation comprising a set of attributes and associated values, wherein the set of attributes comprises a site identifier (ID) that identifies a web site within which the ad impression is located and a custom section ID that identifies a section of the web site within which the ad impression is located, wherein the custom section ID is a multi-value hierarchical attribute associated with multiple custom section values;
identify the multiple custom section values associated with the custom section ID;
determine that a custom section value of the multiple custom section values is associated with an inventory contribution rule that indicates that the ad impression located within the section of the web site identified by the custom section value does not contribute to a parent value of the custom section value;
in response to the determination, modify the set of attributes by adding a new custom section multi-value attribute to the set of attributes;
traverse a branch of the multi-value hierarchical attribute that includes the custom section value to identify which of the multiple custom section values to assign to the new custom section multi-value attribute, wherein the traversal starts with a child of the custom section value and proceeds up the branch until the custom section value is reached, wherein the traversing identifies at least the child and the custom section value;
assign at least the child and the custom section value identified during the traversal with the new custom section multi-value attribute; and
match the modified set of attributes of the ad impression representation with booking attributes of a booking to determine whether to serve an online advertisement associated with the booking over a network for display of the online advertisement according to the ad impression.

13. The display advertising system of claim 12, wherein the processor is further configured to:
identify that no inventory contribution rule is associated with the site ID; and
in response to the identification, assign a root value to the side ID.

14. The display advertising system of claim 12, wherein the set of attributes further comprises a space ID, wherein the inventory contribution rule comprises a first inventory contribution rule, and wherein the processor is further configured to:
identify a first space ID value that is assigned to the space ID;
traverse a hierarchy of space ID values associates with the space ID starting with the first space ID value and progressing up the hierarchy until a second space ID value is reached that is associated with a second inventory contribution rule or until a root value is reached; and assign an additional space ID value to the space ID based on the traversal.

15. The display advertising system of claim 12, wherein the processor is further configured to:
receive a second ad impression representation of a second ad impression, the ad impression representation comprising a second site ID and a second custom section ID,
identify multiple custom section values associated with the second custom section ID;
determine that none of the multiple custom section values is associated with any inventory contribution rule; and
in response to the determination, assign only a root value to the second custom section ID.

16. The display advertising system of claim 12, wherein the processor is further configured to:
modify the booking prior to determining that the custom section value is associated with the inventory contribution rule.

17. The display advertising system of claim 16, wherein processor, in order to modify the booking, is configured to:
determine if a mandatory non-hierarchical single value attribute is included in the booking;
in response to a determination that the mandatory non-hierarchical single value attribute is not included in the booking, add the mandatory single value attribute to the booking and assign a root value thereto.

18. The display advertising system of claim 17, wherein the processor, in order to determine if the mandatory non-hierarchical single value attribute is included in the booking, is configured to determine if a network ID attribute, a publisher ID attribute, a website ID attribute, or any combination thereof is included in the booking.

19. The display advertising system of claim 16, wherein the processor, in order to modify the booking, is configured to:
determine if a mandatory hierarchical single value attribute is included in the booking; and
in response to a determination that the mandatory hierarchical single value attribute is not included in the booking, add the mandatory hierarchical single value attribute to the booking and assign a root value thereto.

20. A storage device storing instructions executable by a processor, wherein the instructions comprise:
instructions executable by the processor to receive an ad impression representation of an ad impression generated in response to a user accessing a web page via a web-enabled electronic device, the ad impression representation comprising a set of attributes and associated values, wherein the set of attributes comprises a site identifier (1D) that identifies a web site within which the ad impression is located and a custom section ID that identifies a section of the web site within which the ad impression is located, wherein the custom section ID is a multi-value hierarchical attribute associated with multiple custom section values;
instructions executable by the processor to identify the multiple custom section values associated with the custom section ID;
instructions executable by the processor to determine that a custom section value of the multiple custom section values is associated with an inventory contribution rule that indicates that the ad impression located within the section of the web site identified by the custom section value does not contribute to a parent value of the custom section value;
instructions executable by the processor to modify the set of attributes by adding a new custom section multi-value attribute to the set of attributes in response to the determination;
instructions executable by the processor to identify which of the multiple custom section values to assign to the new custom section multi-value attribute by traversing a branch of the multi-value hierarchical attribute that includes the custom section value, wherein the traversal starts with a child of the custom section value and proceeds up the branch until the custom section value is reached, and wherein the traversal identifies at least the child and the custom section value;
instructions executable by the processor to assign at least the child and the custom section value identified during the traversal to the new custom section multi-value attribute; and
instructions executable by the processor to match the modified set of attributes of the ad impression representation with booking attributes of a booking to determine whether to serve an online advertisement associated with the booking over a network for display of the online advertisement according to the ad impression.

* * * * *